United States Patent
Park et al.

(10) Patent No.: US 7,995,164 B2
(45) Date of Patent: Aug. 9, 2011

(54) ARRAY SUBSTRATE HAVING A PARTICULAR LIGHT SHIELDING PORTION IN THE NON-DISPLAY REGION

(75) Inventors: Jong-Jin Park, Gyeonggido (KR); Won-Gyun Youn, Gyeongsangbukdo (KR); Kwang-Sik Oh, Gyeongsangbukdo (KR); Myung-Woo Nam, Gyeongsangbukdo (KR); Ki-Du Cho, Gyeongsangbukdo (KR); Se-Jong Shin, Daegu (KR); Bong-Chul Kim, Daegu (KR); Kwon-Seob Choi, Gyeongsangbukdo (KR)

(73) Assignee: LG Display Co., Ltd., Seoul (KR)

( * ) Notice: Subject to any disclaimer, the term of this patent is extended or adjusted under 35 U.S.C. 154(b) by 934 days.

(21) Appl. No.: 11/109,947

(22) Filed: Apr. 20, 2005

(65) Prior Publication Data

US 2005/0243232 A1 Nov. 3, 2005

(30) Foreign Application Priority Data

Apr. 30, 2004 (KR) ........................ 10-2004-0030597

(51) Int. Cl.
*G02F 1/1333* (2006.01)

(52) U.S. Cl. ........................................ 349/110; 349/111

(58) Field of Classification Search .................. 349/106, 349/110, 111
See application file for complete search history.

(56) References Cited

U.S. PATENT DOCUMENTS

| 6,137,552 | A  | * | 10/2000 | Yanai ............................... 349/44 |
| 6,268,895 | B1 | * | 7/2001 | Shimada et al. ............... 349/110 |
| 6,747,724 | B2 |   | 6/2004 | Onaka et al. ................... 349/149 |
| 2001/0046003 | A1 | * | 11/2001 | Song ............................... 349/43 |
| 2003/0095219 | A1 | * | 5/2003 | Lee ............................... 349/110 |
| 2004/0125277 | A1 | * | 7/2004 | Kim et al. ...................... 349/106 |

FOREIGN PATENT DOCUMENTS

CN 1334479 A 2/2002

(Continued)

OTHER PUBLICATIONS

H. Hayama, et al., Ultra High Resolution TFT-LCDs and Their Technologies, SID 00 Digest (2000), pp. 1112-1115.

*Primary Examiner* — Jessica M Merlin
(74) *Attorney, Agent, or Firm* — Morgan, Lewis & Bockius LLP

(57) ABSTRACT

An array substrate for a liquid crystal display (LCD) device includes a substrate having a display region and a non-display region at periphery portions of the display region, the non-display region including first, second, third and fourth regions; a plurality of gate lines parallel to the second and fourth regions, the plurality of gate lines including a first gate line closest to the second region and a second gate line closest to the fourth region; a plurality of data lines parallel to the first and third regions and crossing the plurality of gate lines to define a plurality of pixel regions in the display region, the plurality of data lines including a first data line closest to the first region; and a light-shielding portion corresponding to the non-display region and disposed at the same layer as at least one of the gate line and the data line, the light-shielding portion including first, second, third and fourth portions corresponding to the first, second, third and fourth regions, respectively.

33 Claims, 13 Drawing Sheets

FOREIGN PATENT DOCUMENTS

| | | |
|---|---|---|
| CN | 1485655 A | 3/2004 |
| JP | 5-72562 | 3/1993 |
| JP | 07-013200 | 1/1995 |
| JP | 10-123567 | 5/1998 |
| JP | 10-307299 | 11/1998 |
| JP | 2000-122093 | 4/2000 |
| JP | 2000-353808 | 12/2000 |
| JP | 2001-53287 | 2/2001 |
| JP | 2001-117085 | 4/2001 |
| JP | 2001-272662 | 10/2001 |
| JP | 2002-049057 | 2/2002 |
| JP | 2003-287762 | 10/2003 |
| JP | 2003-332585 | 11/2003 |
| KR | 10-2001-0011902 A | 2/2001 |
| KR | 10-2001-0104068 A | 11/2001 |
| KR | 10-2003-0039938 A | 5/2003 |

* cited by examiner

ARRAY SUBSTRATE HAVING A PARTICULAR LIGHT SHIELDING PORTION IN THE NON-DISPLAY REGION

The present invention claims the benefit of Korean Patent Application No. 2004-0030597 filed in Korea on Apr. 30, 2004, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate for a LCD device and fabricating method thereof.

2. Discussion of the Related Art

Until recently, display devices have typically used cathode-ray tubes (CRTs). Presently, much effort is being made to research and develop various types of flat panel displays, such as liquid crystal display (LCD) devices, plasma display panels (PDPs), field emission displays, and electro-luminescence displays (ELDs) as substitutes for CRTs. Of these flat panel displays, LCD devices have many advantages, such as high resolution, light weight, thin profile, compact size, and low voltage power supply requirements.

In general, an LCD device includes two substrates that are spaced apart and facing each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view of an LCD device according to the related art. As shown in FIG. 1, the LCD device 11 includes an upper substrate 5, a lower substrate 22 and a liquid crystal 14. The upper substrate 5 is referred to as a color filter substrate that includes color filter patterns 8, a black matrix 6 between the color filter patterns 8, and a common electrode 18 on both the color filter patterns 8 and the black matrix 6. The lower substrate 22 is referred to as an array substrate that includes a data line 15 and a gate line 13 that cross each other and define a pixel region P. A pixel electrode 17 and a thin film transistor T as a switching element are positioned in each pixel region P. Thin film transistors T, which are disposed adjacent to the crossings of the data lines 15 and the gate lines 13, are disposed in a matrix on the lower substrate 22. The gate line 13 and a storage electrode 30 overlapping the gate line 13 define a storage capacitor C.

In the process of attaching the color filter substrate to the array substrate of FIG. 1, misalignment may occur thereby causing light leakage. Due to the possibility of misalignment during attachment, the black matrix is formed with a margin of error to compensate for the possible misalignment. Thus, an aperture ratio of the LCD device is reduced.

FIG. 2 is a cross-sectional view of a color filter-on-transistor (COT) LCD device according to the related art. As shown in FIG. 2, in a COT LCD, a display region D and a non-display region ND are defined.

In the display region D, a lower substrate 40 includes a thin film transistor T having a gate electrode 42, a semiconductor pattern 44, and source and drain electrodes 46 and 48. The array substrate further includes a black matrix 54 and color filter patterns (R and G) 52a and 52b. The black matrix 54 corresponds to the thin film transistor T. The color filter patterns (R and G) 52a and 52b include red color filter pattern (R) 52a, green color filter pattern (G) 52b and blue color filter pattern (not shown) corresponding to respective pixel regions P. A pixel electrode 56 is disposed in each pixel region P. In the display region D, an upper substrate 70 includes a common electrode 72. To maintain a gap between the lower and upper substrates 40 and 70, a spacer 80 is disposed between the lower and upper substrates 40 and 70. In the non-display region ND, a light-shielding portion 74 is disposed on the upper substrate 70 to shield leakage of light.

In order that the black matrix 54 disposed on the lower substrate 40 prevents reflection of light, the black matrix 54 should have a permittivity no less than 3.0. However, since the generally used black matrix has carbon as a main ingredient, it does not act as insulator. Accordingly, only a small amount of carbon is added to reduce a permittivity. Here, the black matrix having a small amount of carbon does not shield incident light. Therefore, in the non-display region ND, a separate light-shielding portion 74 is disposed on the upper substrate 70.

However, in the related art COT LCD, the number of separate processes to form the light-shielding portion increases, thereby increasing production cost. Additionally, a margin for attaching the upper and lower substrates is needed, and misalignment during attachment can occur.

SUMMARY OF THE INVENTION

Accordingly, the present invention is directed to an array substrate for liquid crystal display (LCD) device and a fabricating method thereof that substantially obviate one or more of problems due to limitations and disadvantages of the related art.

An object of the present invention is to provide a color filter-on-transistor (COT) liquid crystal display (LCD) device and a fabricating method thereof that can reduce production process and cost.

Another object of the present invention is to provide a liquid crystal display (LCD) device and a fabricating method thereof that can prevent misalignment of the substrates during attachment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display (LCD) device comprises a substrate having a display region and a non-display region at periphery portions of the display region, the non-display region including first, second, third and fourth regions; a plurality of gate lines parallel to the second and fourth regions, the plurality of gate lines including a first gate line closest to the second region and a second gate line closest to the fourth region; a plurality of data lines parallel to the first and third regions and crossing the plurality of gate lines to define a plurality of pixel regions in the display region, the plurality of data lines including a first data line closest to the first region; and a light-shielding portion corresponding to the non-display region and disposed at the same layer as at least one of the gate line and the data line, the light-shielding portion including first, second, third and fourth portions corresponding to the first, second, third and fourth regions, respectively.

In another aspect, a method of fabricating an array substrate for a liquid crystal display (LCD) device comprises forming a plurality of gate lines on a substrate having a display region and a non-display region at periphery portions of the display region, the non-display region including first, second, third and fourth regions, and the plurality of gate lines parallel to the second and fourth regions and including a first gate line closest to the second region and a second gate line closest to the fourth region; forming a plurality of data lines parallel to the first and third regions and crossing the plurality of gate lines to define a plurality of pixel regions in the display region, the plurality of data lines including a first data line closest to the first region; and forming a light-shielding portion corresponding to the non-display region, the light-shielding portion formed at the same layer as at least one of the gate line and the data line and including first, second, third and fourth portions corresponding to the first, second, third and fourth regions, respectively.

In another aspect, an array substrate for a liquid crystal display (LCD) device comprises a substrate having a display region and a non-display region at periphery portions of the display region, the non-display region including first, second, third and fourth regions; a plurality of gate lines parallel to the second and fourth regions, the plurality of gate lines including a first gate line closest to the second region and a second gate line closest to the fourth region; a plurality of data lines parallel to the first and third regions and crossing the plurality of gate lines to define a plurality of pixel regions in the display region, the plurality of data lines including a first data line closest to the first region; a thin film transistor including a semiconductor pattern in each pixel region; a color filter pattern in each pixel region; and a light-shielding portion corresponding to the non-display region and disposed at the same layer as at least one of the semiconductor pattern, the color filter pattern, and the data lines, wherein the light-shielding portion includes first, second, third and fourth portions corresponding to the first, second, third and fourth regions, respectively.

In another aspect, a method of fabricating an array substrate for a liquid crystal display (LCD) device comprises forming a plurality of gate lines on a substrate having a display region and a non-display region at periphery portions of the display region, the non-display region including first, second, third and fourth regions, and the plurality of gate lines parallel to the second and fourth regions and including a first gate line closest to the second region and a second gate line closest to the fourth region; forming a plurality of data lines parallel to the first and third regions and crossing the plurality of gate lines to define a plurality of pixel regions in the display region, the plurality of data lines including a first data line closest to the first region; forming a thin film transistor including a semiconductor pattern in each pixel region; forming a color filter pattern in each pixel region; and forming a light-shielding portion corresponding to the non-display region, the light-shielding portion formed at the same layer as at least one of the semiconductor pattern, the color filter pattern, and the data lines and including first, second, third and fourth portions corresponding to the first, second, third and fourth regions, respectively.

In another aspect, an array substrate for a liquid crystal display (LCD) device comprises a substrate having a display region and a non-display region at periphery portions of the display region, the non-display region including first, second, third and fourth regions; a plurality of gate lines parallel to the second and fourth regions, the plurality of gate lines including a first gate line closest to the second region and a second gate line closest to the fourth region; a plurality of data lines parallel to the first and third regions and crossing the plurality of gate lines to define a plurality of pixel regions in the display region, the plurality of data lines including a first data line closest to the first region; a thin film transistor including a semiconductor pattern in each pixel region; a color filter pattern in each pixel region; and a light-shielding portion corresponding to the non-display region and disposed at the same layer as at least one of the semiconductor pattern, the color filter pattern, the gate line, and the data line, wherein the light-shielding portion includes first, second, third and fourth portions corresponding to the first, second, third and fourth regions, respectively.

It is to be understood that both the foregoing general description and the following detailed description are exemplary and explanatory and are intended to provide further explanation of the invention as claimed:

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
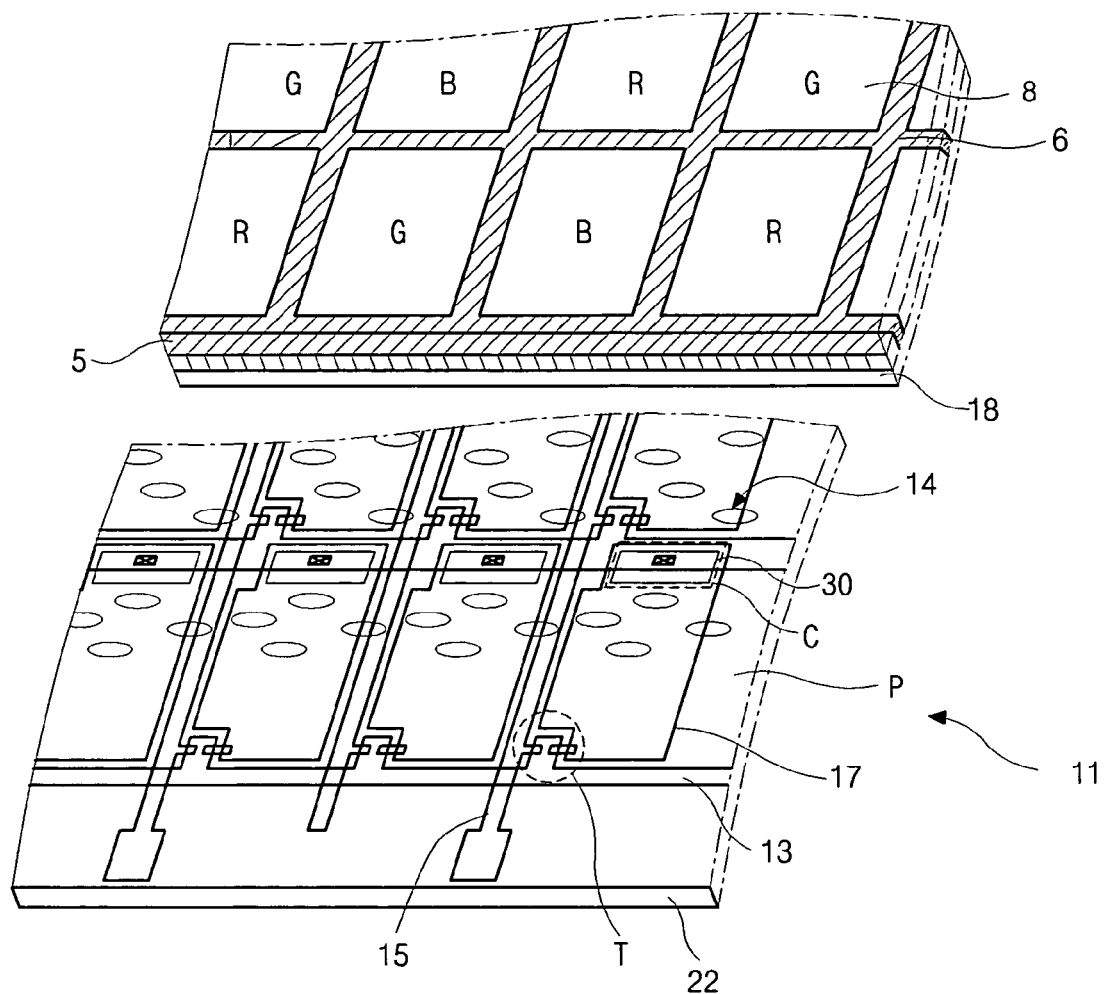
FIG. 1 is a perspective view of an LCD device according to the related art.
Figure 2:
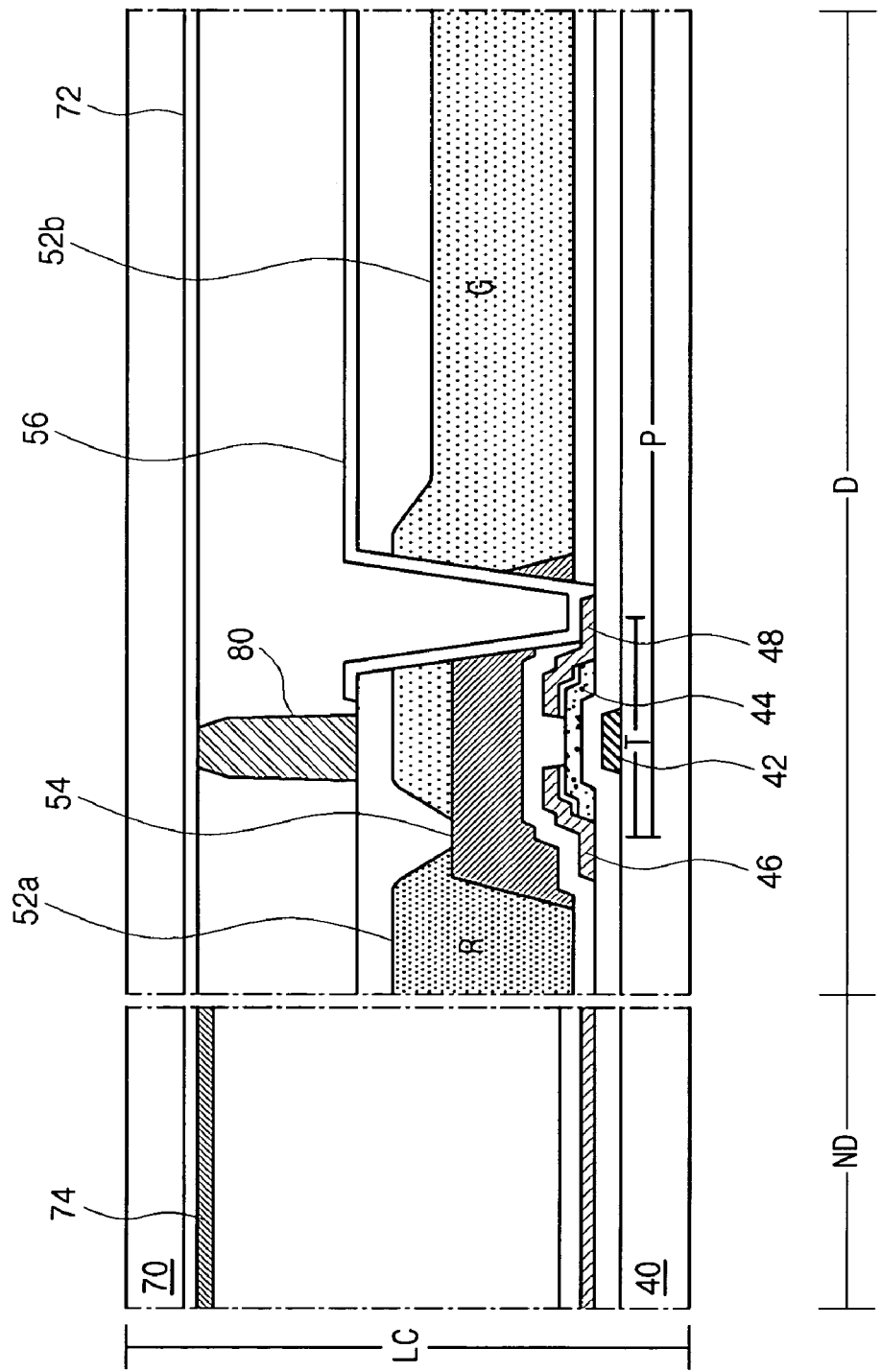
FIG. 2 is a cross-sectional view of a color filter-on-transistor (COT) LCD device according to the related art.
Figure 3:
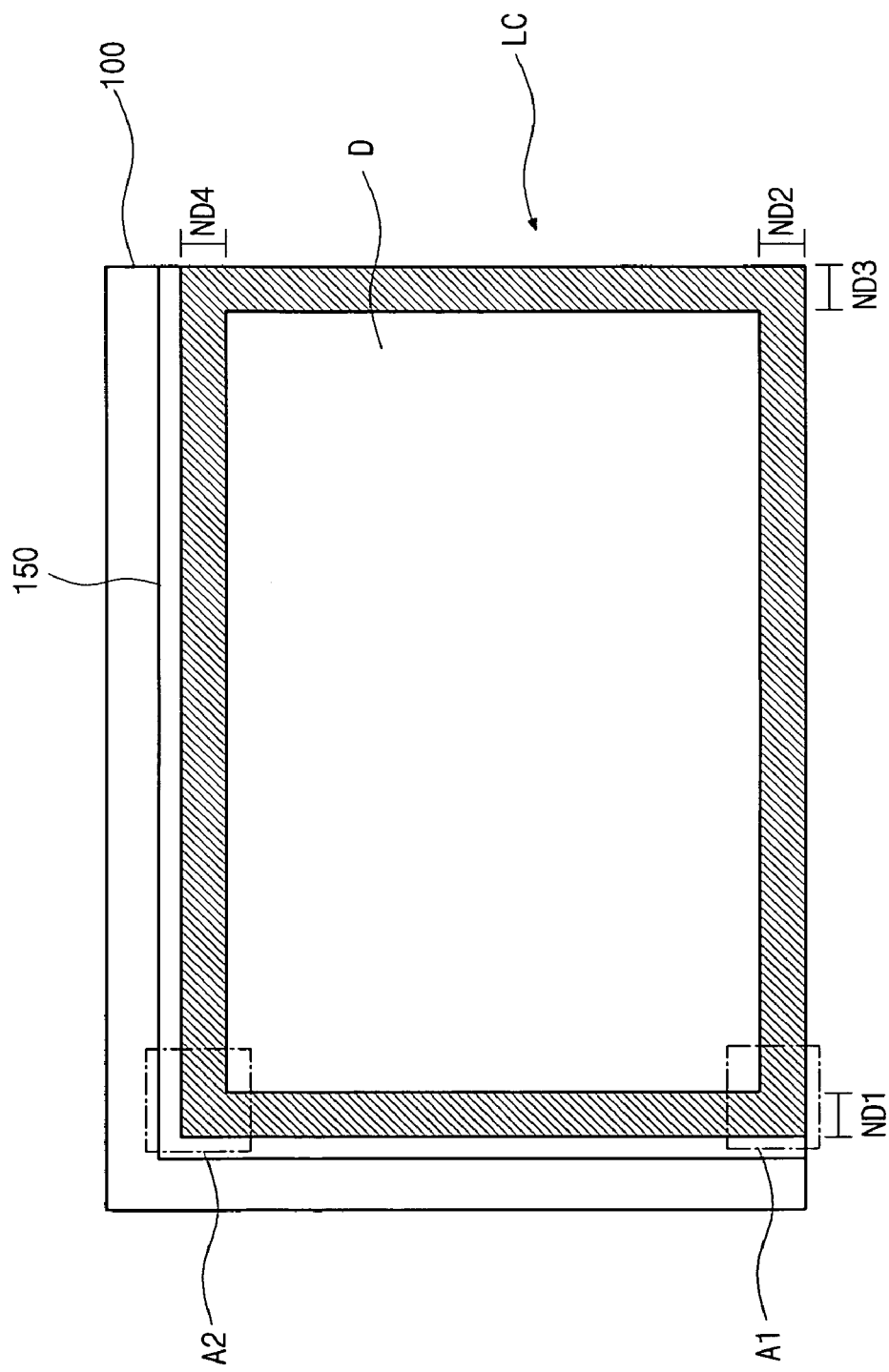
FIG. 3 is a plan view of an exemplary color filter-on-thin film transistor (COT) liquid crystal display (LCD) device according to a configuration of the present invention.

FIG. 3 is a plan view of a color filter-on-thin film transistor (COT) liquid crystal (LCD) device according to the present invention. As shown in FIG. 3, a COT LCD device LC includes a first substrate 100 as a lower substrate and a second substrate 150 as an upper substrate. Although not shown in FIG. 3, the first substrate 100 may include array lines such as data and gate lines, a thin film transistor and a pixel electrode, the second substrate 150 may include a common electrode, and a liquid crystal material is interposed between the two substrates 100 and 150.

In the COT LCD device LC, a display region D and a non-display region ND are define. The non-display region ND is disposed at periphery portions of the display region D and surrounds the display region D. The non-display region ND includes first, second, third and fourth non-display regions ND1, ND2, ND3 and ND4. The first and third non-display regions ND1 and ND3 are parallel to the data line, and the second and fourth non-display regions ND2 and ND4 are parallel to the gate line. In the first to fourth non-display regions ND1 to ND4, first to fourth light-shielding portions are disposed, respectively. In the non-display region ND, a light-shielding portion is disposed on the first substrate 100 in the same process of forming array lines.

Figure 4:
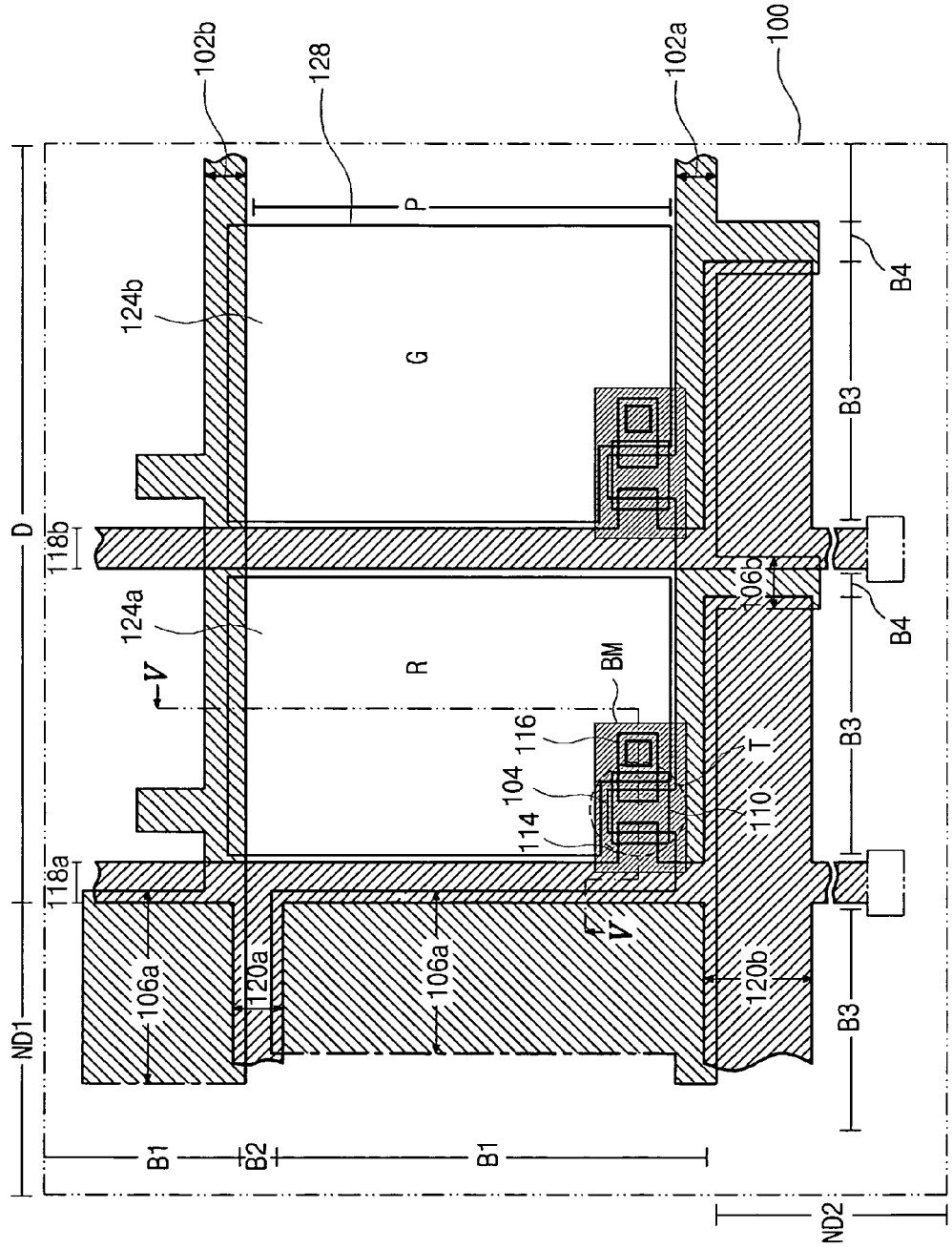
FIG. 4 is a plan view showing an enlargement of a region "A1" in FIG. 3 of a first substrate for a COT LCD according to a first exemplary embodiment of the present invention.

FIG. 4 is a plan view showing an enlargement of a region "A1" in FIG. 3 of a first substrate for a COT LCD according to a first exemplary embodiment of the present invention. As shown in FIG. 4, on a first substrate 100, gate and data lines 102 and 118 cross each other, thereby defining pixel regions P in a display region D. The gate lines 102 include a first gate line 102a closest to a second non-display region ND2 and a second gate line 102b adjacent to the first gate line 102a. The data lines 118 include a first data line 118a closest to a first non-display region ND1 and a second data line 118b adjacent to the first data line 118a.

A thin film transistor T is disposed at the crossing of the gate and data lines 102 and 118. The thin film transistor T includes a gate electrode 104, a semiconductor pattern 110, a source electrode 114, and a drain electrode 116. A black matrix BM is disposed corresponding to the thin film transistor T. Optionally, the black matrix BM may be disposed corresponding to the gate and data lines 102 and 118. In respective pixel regions P, color filter patterns (R and G) 124a and 124b are disposed. The color filter patterns (R and G) 124a and 124b include a red color filter pattern (R) 124a, a green color filter pattern (G) 124b and a blue color filter pattern (not shown) corresponding to respective pixel regions P. A pixel electrode 128 corresponds to each color filter pattern (R and G) 124a and 124b. In the first and second non-display regions ND1 and ND2, a light-shielding portion is disposed to prevent leakage of light therein.

In the first non-display region ND1 parallel to the data line 118, a first light-shielding portion covers a space between adjacent gate lines 102, i.e., the first and second gate lines 102a and 102b. The first light-shielding portion includes first and second light-shielding patterns 106a and 120a. The first light-shielding pattern 106a is extended from the first gate line 102a to the second gate line 102b. In other words, the first light-shielding pattern 106a is disposed in a space B1 between the first and second gate lines 102a and 102b. Since the first light-shielding pattern 106a should not be connected to the second gate line 102b, the second light-shielding pattern 120a may be extended from the first data line 118a to cover a space B2 between the first light-shielding pattern 106a and the second gate line 102b. The second light-shielding pattern 120a may overlap the first light-shielding pattern 106a and the second gate line 102b, and an overlap width between the two may be equal to or less than 3 µm (micrometers) to prevent parasitic capacitance.

In the second non-display region ND2 parallel to the gate line 102, a second light-shielding portion covers a space between adjacent data lines 118, i.e., the first and second data lines 118a and 118b. The second light-shielding portion includes third and fourth light-shielding patterns 120b and 106b. The third light-shielding pattern 120b is extended from the first data line 118a to the second data line 118b. In other words, the third light-shielding pattern 120b is disposed in a space B3 between the first and second data lines 118a and 118b. Since the third light-shielding pattern 120b should not be connected to the second data line 118b, the fourth light-shielding pattern 106b may be extended from the first gate line 102a to cover a space B4 between the third light-shielding pattern 120b and the second data line 118b. The fourth light-shielding pattern 106b may overlap the third light-shielding pattern 120b and the second data line 118b, and an overlap width between the two may be equal to or less than 3 µm (micrometers) (micrometers) to prevent parasitic capacitance.

In accordance with the first embodiment of the present invention, the first light-shielding portion covers a space between adjacent gate lines in the first non-display region, and the second light-shielding portion covers a space between adjacent data lines in the second non-display region. The first light-shielding portion includes the first light-shielding pattern extended from the gate line to adjacent gate line and the second light-shielding pattern extended from the data line and covering a space between the first light-shielding pattern and adjacent gate line. The second light-shielding portion includes the third light-shielding pattern extended from the data line to adjacent data line and the fourth light-shielding pattern extended from the gate line and covering a space between the third light-shielding pattern and adjacent data line. Although not explained in the above first embodiment of present invention, a third light-shielding portion of a third non-display region may have the same structure as the first light-shielding portion of the first non-display region.

In the first embodiment of the present invention, since the light-shielding portion can be formed in the same process as when forming the gate and data lines, a separate processes to form the light-shielding portion is not needed. Therefore, production process and cost can be reduced. Additionally, the light-shielding portion is formed on the same substrate where the thin film transistor and the color filter pattern are formed. Therefore, misalignment during attachment can be prevented.

Figure 5:
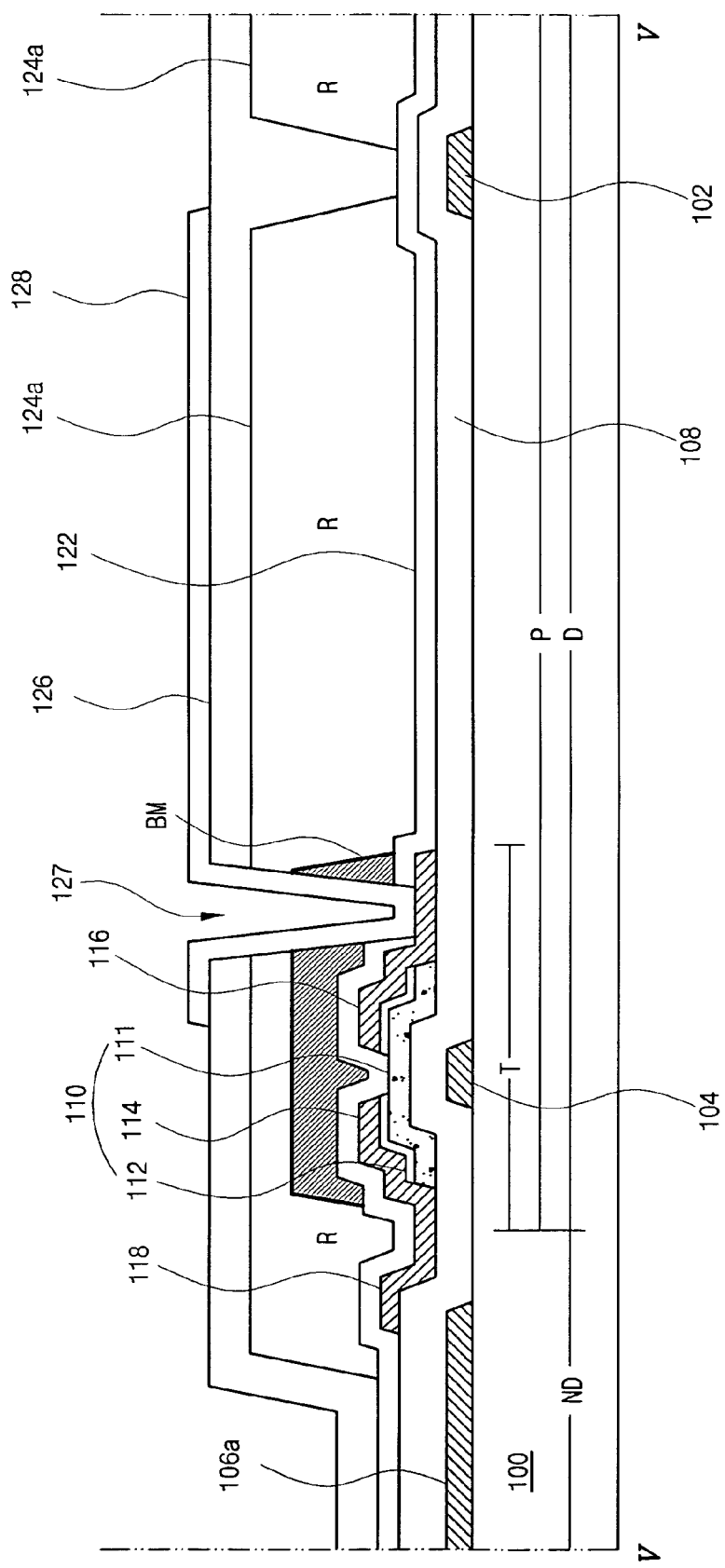
FIG. 5 is a cross-sectional view taken along cross-sectional line V-V of FIG. 4.

FIG. 5 is a cross-sectional view taken along cross-sectional line V-V of FIG. 4. In FIG. 5, a non-display region ND is the first non-display region in FIG. 4.

As shown in FIG. 5, on a substrate 100 having a display region D and a non-display region ND, a first metal is deposited and patterned to form a gate line 102, a gate electrode 104, a first light-shielding pattern 106a, and a fourth light-shielding pattern (106b in FIG. 4). The gate line 102 is formed in both the display region D and the non-display region ND.

A gate insulating layer 108 is formed entirely on the substrate 100 having the gate line 102. The gate insulating layer 108 may be made of inorganic material such as silicon nitride and silicon oxide. A semiconductor pattern 110 is formed on the gate insulating layer 108 corresponding to the gate electrode 104. The semiconductor pattern 110 includes an active layer 111 and an ohmic contact layer 112 subsequently disposed on the gate insulating layer 108. The active layer 111 may be made of intrinsic amorphous silicon, and the ohmic contact layer 112 may be made of doped amorphous silicon.

A second metal is deposited on the substrate having the semiconductor pattern 110, and patterned to form a data line 118, source and drain electrodes 114 and 116, a second light-shielding pattern (120a in FIG. 4) and a third light-shielding pattern (120b in FIG. 4). The data line 118 is formed in both the display region D and the non-display region ND. Through the above processes, a thin film transistor T including the gate electrode 104, the semiconductor pattern 110, and source and drain electrodes 114 and 116 is formed.

A passivation layer 122 is formed entirely on the substrate 100 having the data line 118. The passivation layer 122 may be made of inorganic material such as silicon nitride and silicon oxide. A black resin is deposited on the passivation layer 122 and patterned to form a black matrix BM corresponding to the thin film transistor T. The black matrix BM may correspond to the gate and data lines 102 and 118.

A red color resin is deposited on the substrate 100 having the black matrix BM and patterned to form a red color filter pattern (R) 124a in a pixel region P. In methods similar to that of forming the red color filter pattern (R) 124a, a green color filter pattern (124b in FIG. 4) and a blue color filter pattern (not shown) are formed in respective pixel regions P.

A planarization layer 126 is formed entirely on the substrate 100 having the color filter pattern 124a. The planarization layer 126 may be made of organic material such as benzo-cyclo-butene (BCB) and acrylic resin. The planarization layer 126, the color filter pattern 126a, the black matrix BM, the passivation layer 122 are patterned to form a contact hole 127 exposing the drain electrode 116.

A pixel electrode 128 is formed on the planarization layer 126 contacting the drain electrode 116 through the contact hole 127. The pixel electrode 128 may be made of transparent conductive material such as indium-tin-oxide (ITO) or indium-zinc-oxide (IZO).

Figure 6:
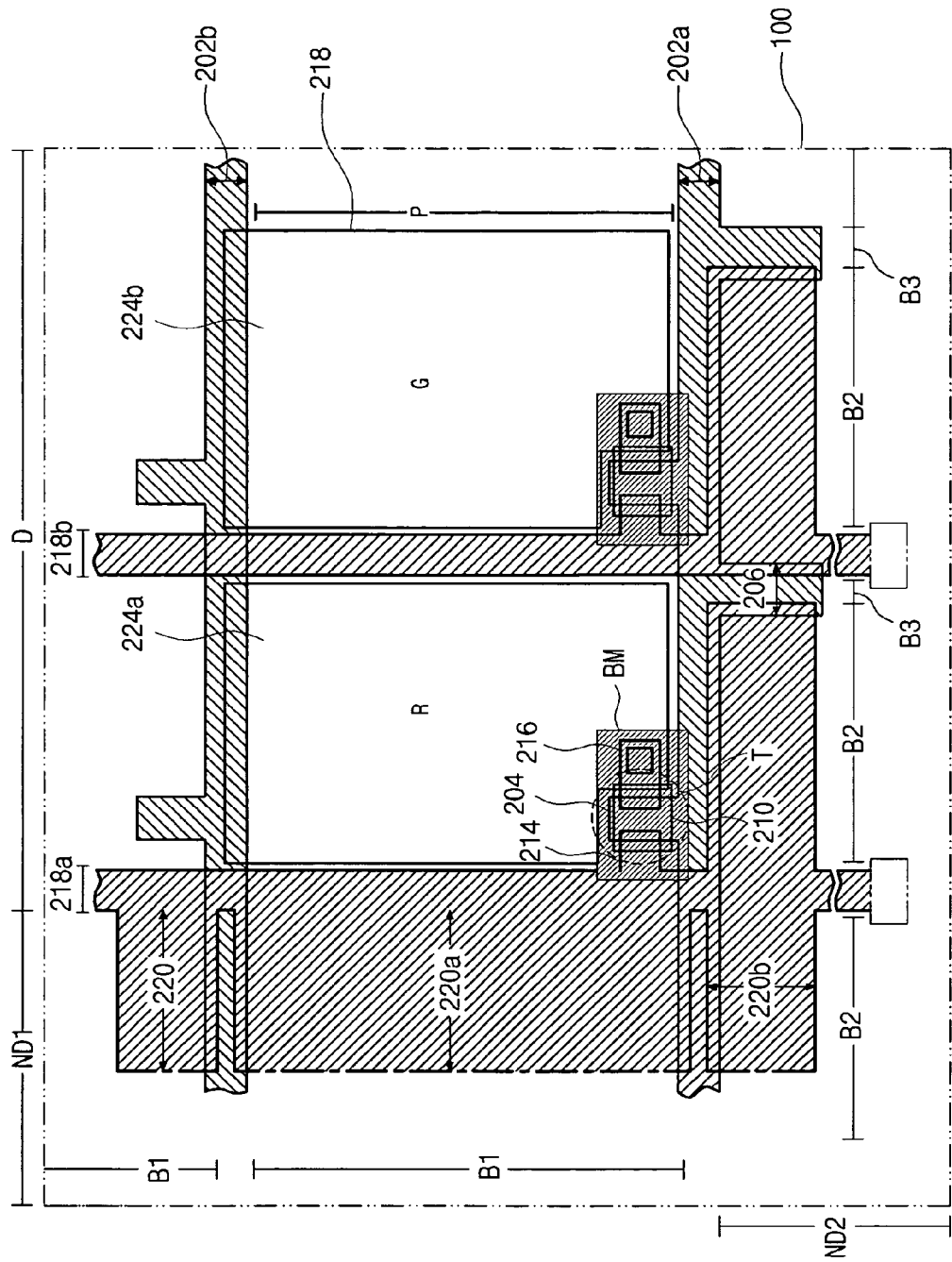
FIG. 6 is a plan view showing an enlargement of a region "A1" in FIG. 3 of a first substrate for a COT LCD according to a second exemplary embodiment of the present invention.

FIG. 6 is a plan view showing an enlargement of a region "A1" in FIG. 3 relating to a first substrate for a COT LCD according to a second exemplary embodiment of the present invention. A substrate for a COT LCD device of the second embodiment is similar to that of the first embodiment, except for a light-shielding portion in a non-display region. In the second embodiment, explanations of parts similar to parts in the first embodiment will be omitted.

As shown in FIG. 6, in a display region D of a first substrate 100, gate lines 202 are disposed including first and second gate lines 202a and 202b, data lines 218 including first and second data lines 218a and 218b, a thin film transistor T in each pixel region P, a black matrix BM corresponding to the thin film transistor T, color filter patterns (R and G) 224a and 224b, and a pixel electrode 228 in each pixel region P.

In a first non-display region ND1 parallel to the data line 218, a first light-shielding portion covers a space between adjacent gate lines 202, i.e., the first and second gate lines 202a and 202b. The first light-shielding portion includes a first light-shielding pattern 220a. The first light-shielding pattern 220a is extended from the first data line 218a and covers a space B1 between the first and second gate lines 202a and 202b. The first light-shielding pattern 220a may overlap the first and second gate lines 202a and 202b, and an overlap width between the two may be equal to or less than 3 μm (micrometers) to prevent parasitic capacitance. Adjacent first light-shielding patterns 220a are separated from each other.

In the second non-display region ND2 parallel to the gate line 202, a second light-shielding portion covers a space between adjacent data lines 218, i.e., the first and second data lines 218a and 218b. The second light-shielding portion includes second and third light-shielding patterns 220b and 206. The second light-shielding pattern 220b is extended from the first data line 218a to the second data line 218b. In other words, the second light-shielding pattern 220b is disposed in a space B2 between the first and second data lines 218a and 218b. Since the second light-shielding pattern 220b should not be connected to the second data line 218b, the third light-shielding pattern 206 may be extended from the first gate line 202a to cover a space B3 between the second light-shielding pattern 220b and the second data line 218b. The third light-shielding pattern 206 may overlap the second light-shielding pattern 220b and the second data line 218b, and an overlap width between the two may be equal to or less than 3 μm (micrometers) to prevent parasitic capacitance.

In accordance with the second embodiment of the present invention, the first light-shielding portion covers a space between adjacent gate lines in the first non-display region, and the second light-shielding portion covers a space between adjacent data lines in the second non-display region. The first light-shielding portion includes the first light-shielding pattern extended from the data line and covering a space between adjacent gate lines. The second light-shielding portion includes the second light-shielding pattern extended from the data line to adjacent data line, and the third light-shielding pattern extended from the gate line and covering a space between the second light-shielding pattern and adjacent data line. Although not explained in the above second embodiment of present invention, a third light-shielding portion of a third non-display region may have the same structure as the first light-shielding portion of the first non-display region.

The fabricating method of the substrate for the COT LCD device according to the second embodiment is similar to that according to the first embodiment, except for the light-insulating portion in the non-display region. Therefore, in the second embodiment, the fabricating method of the substrate for the COT LCD device is similar to that of the first embodiment.

Figure 7:
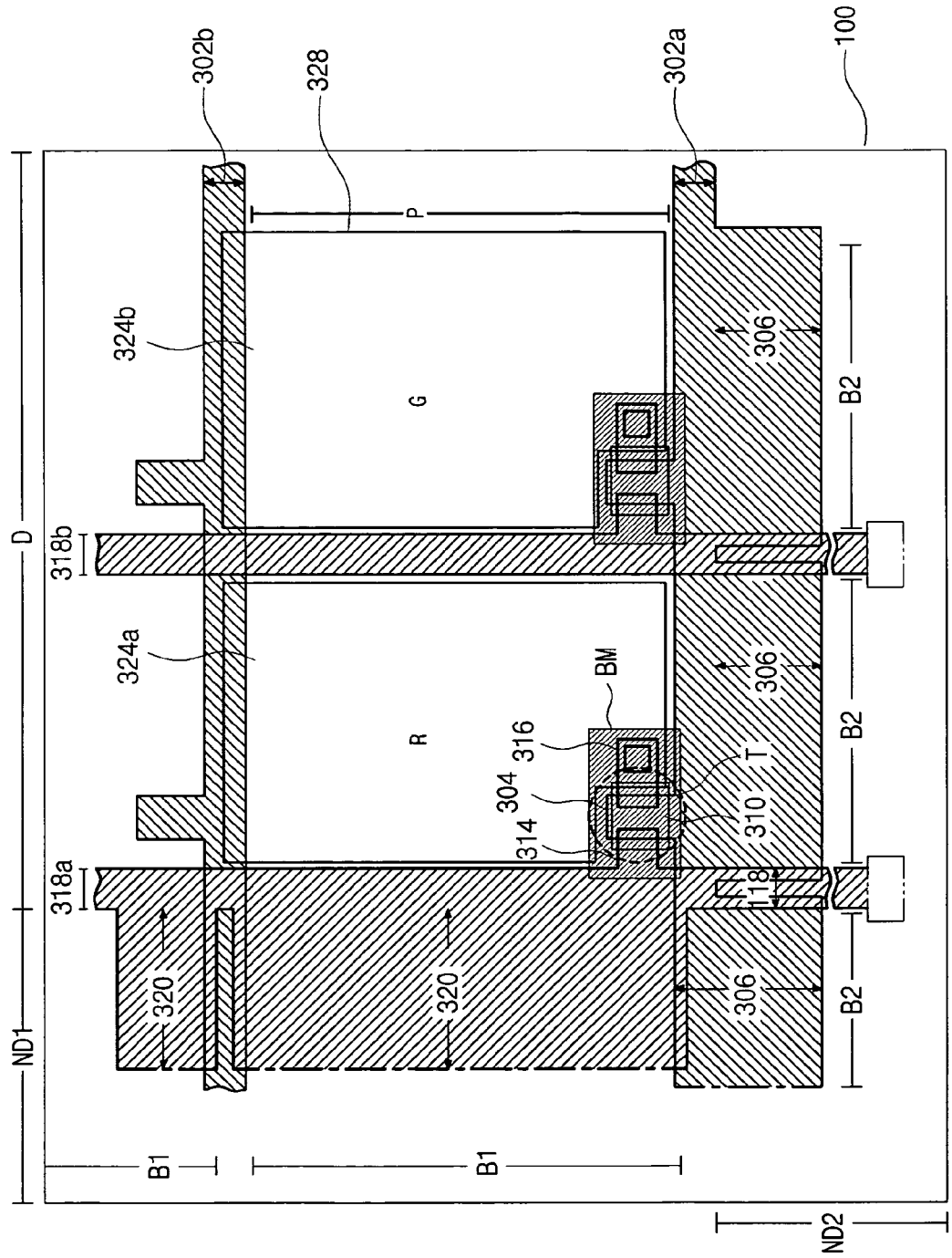
FIG. 7 is a plan view showing an enlargement of a region "A1" in FIG. 3 of a first substrate for a COT LCD according to a third exemplary embodiment of the present invention.

FIG. 7 is a plan view showing an enlargement of a region "A1" in FIG. 3 of a first substrate for a COT LCD according to a third exemplary embodiment of the present invention. A substrate for a COT LCD device of the third embodiment is similar to that of the first and second embodiments, except for a light-shielding portion in a non-display region. In the third embodiment, explanations of parts similar to parts in the first and second embodiments will be omitted.

As shown in FIG. 7, in a display region D of a first substrate 100, gate lines 302 are disposed including first and second gate lines 302a and 302b, data lines 318 including first and second data lines 318a and 318b, a thin film transistor T in each pixel region P, a black matrix BM corresponding to the thin film transistor T, color filter patterns (R and G) 324a and 324b, and a pixel electrode in each pixel region P. In a first non-display region ND1 parallel to the data line 318, a first light-shielding portion covers a space between adjacent gate lines 302, i.e., the first and second gate lines 302a and 302b. The first light-shielding portion includes a first light-shielding pattern 320. The first light-shielding pattern 320 is extended from the first data line 318a and covers a space B1 between the first and second gate lines 302a and 302b. The first light-shielding pattern 320 may overlap the first and second gate lines 302a and 302b, and an overlap width between the two may be equal to or less than 3 μm (micrometers) to prevent a parasitic capacitor. Adjacent first light-shielding patterns 320 are apart from each other. In the second non-display region ND2 parallel to the gate line 302, a second light-shielding portion covers a space between adjacent data lines 318, i.e., the first and second data lines 318a and 318b. The second light-shielding portion includes a second light-shielding pattern 306. The second light-shielding pattern 306 is extended from the first gate line 302 and covers a space B2 between the first and second data lines 318a and 318b. The second light-shielding pattern 306 may overlap the first and second data lines 318a and 318b, and an overlap width between the two may be equal to or less than 3 µm (micrometers) to prevent a parasitic capacitor. Adjacent second light-shielding patterns 306 are apart from each other.

In accordance with the third embodiment of the present invention, the first light-shielding portion covers a space between adjacent gate lines in the first non-display region, and the second light-shielding portion covers a space between adjacent data lines in the second non-display region. The first light-shielding portion includes the first light-shielding pattern extended from the data line and covering a space between adjacent gate lines. The second light-shielding portion includes the second light-shielding pattern extended from the data line and covering a space between adjacent data lines. Although not explained in the above third embodiment of present invention, a third light-shielding portion of a third non-display region may have the same structure as the first light-shielding portion of the first non-display region.

The fabricating method of the substrate for the COT LCD device according to the third embodiment is similar to that of the first and second embodiments, except for the light-insulating portion in the non-display region. Therefore, in the third embodiment, the fabricating method of the substrate for the COT LCD device is similar to that of the first and second embodiments.

Figure 8:
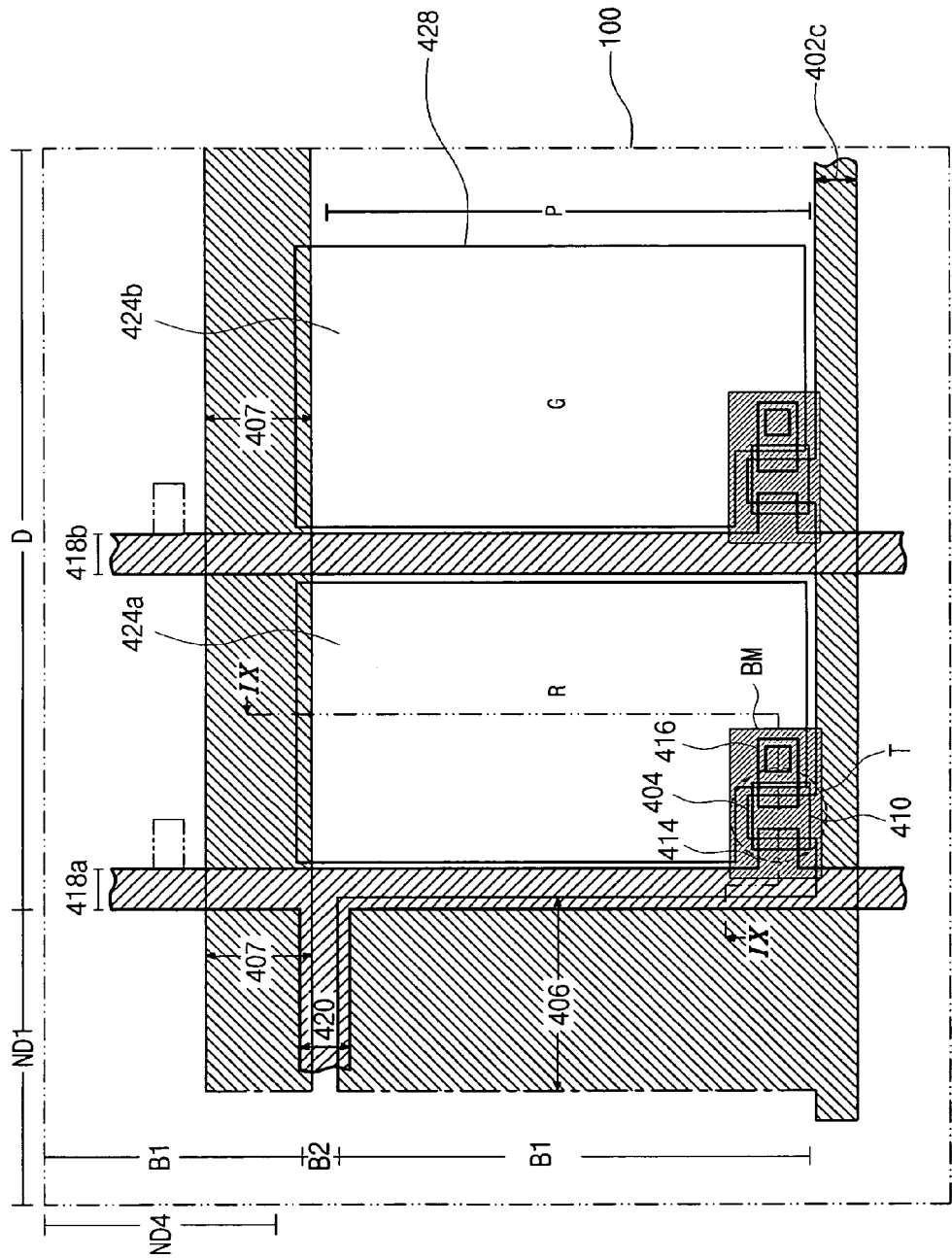
FIG. 8 is a plan view showing an enlargement of a region "A2" in FIG. 3 of a first substrate for a COT LCD according to a fourth exemplary embodiment of the present invention.

FIG. 8 is a plan view showing an enlargement of a region "A2" in FIG. 3 of a first substrate for a COT LCD according to a fourth exemplary embodiment of the present invention. The fourth embodiment relates to first and fourth non-display regions. A substrate for a COT LCD device of the fourth embodiment is similar to that of the first to third embodiments, except for a light-shielding portion in a non-display region. In the fourth embodiment, explanations of parts similar to parts in the first to third embodiments will be omitted.

As shown in FIG. 8, in a display region D of a first substrate 100, a third gate line 402c, data lines 418 including first and second data lines 418a and 418b, a thin film transistor T in each pixel region P, a black matrix BM corresponding to the thin film transistor T, color filter patterns (R and G) 424a and 424b, and a pixel electrode 428 in each pixel region P are disposed. The third gate line 402c is closest to a fourth non-display region ND4. In a first non-display region ND1 parallel to the data line 418, a first light-shielding portion covers a space between adjacent gate lines 402. In the fourth non-display region ND4, a fourth light-shielding portion is disposed parallel to the third gate line 402c.

The first light-shielding portion of the fourth embodiment corresponds to that of the first embodiment. The first light-shielding portion includes a first light-shielding pattern 406 extended from the third gate line 402c and a second light-shielding pattern extended from the first data line 418a. The fourth light-shielding portion includes a third light-shielding pattern 407 parallel to and apart from the third gate line 402c. The third light-shielding pattern 407 is extended along an extension direction of the third gate line 402c. The first light-shielding pattern 406 closest to the fourth non-display region ND4 is extended to the third light-shielding pattern 407, and disposed in a space B1 between the third gate line 402c and the third light-shielding pattern 407. The first light-shielding pattern 406 is apart from the third light-shielding pattern 407 because the resistance of the third gate line 402c increases greatly if the first and third light-shielding patterns 406 and 407 contact each other. Accordingly, the second light-shielding pattern 420 is extended from the first data line 418a to cover a space B2 between the first light-shielding pattern 406 and the third light-shielding pattern 407. The second light-shielding pattern 420 may overlap the first and third light-shielding patterns 406 and 407, and an overlap width between the two may be equal to or less than 3 µm (micrometers) to prevent a parasitic capacitance.

In accordance with the fourth embodiment of the present invention, the first light-shielding portion covers a space between adjacent gate lines and between the gate line closest to the fourth light-shielding portion and the fourth light-shielding portion in the first non-display region, and the fourth light-shielding portion is disposed in the fourth non-display region. The first light-shielding portion includes the first light-shielding pattern extended from the gate line closest to the fourth light-shielding portion to the fourth light-shielding portion, and the second light-shielding pattern extended from the data line and covering a space between the first light-shielding pattern and the fourth light-shielding portion. The fourth light-shielding portion includes the third light-shielding pattern parallel to and apart from the gate line closest to the fourth light-shielding portion and extended along an extension direction of the gate line. Although not explained in the above fourth embodiment of present invention, a third light-shielding portion of a third non-display region may have the same structure as the first light-shielding portion of the first non-display region.

Figure 9:
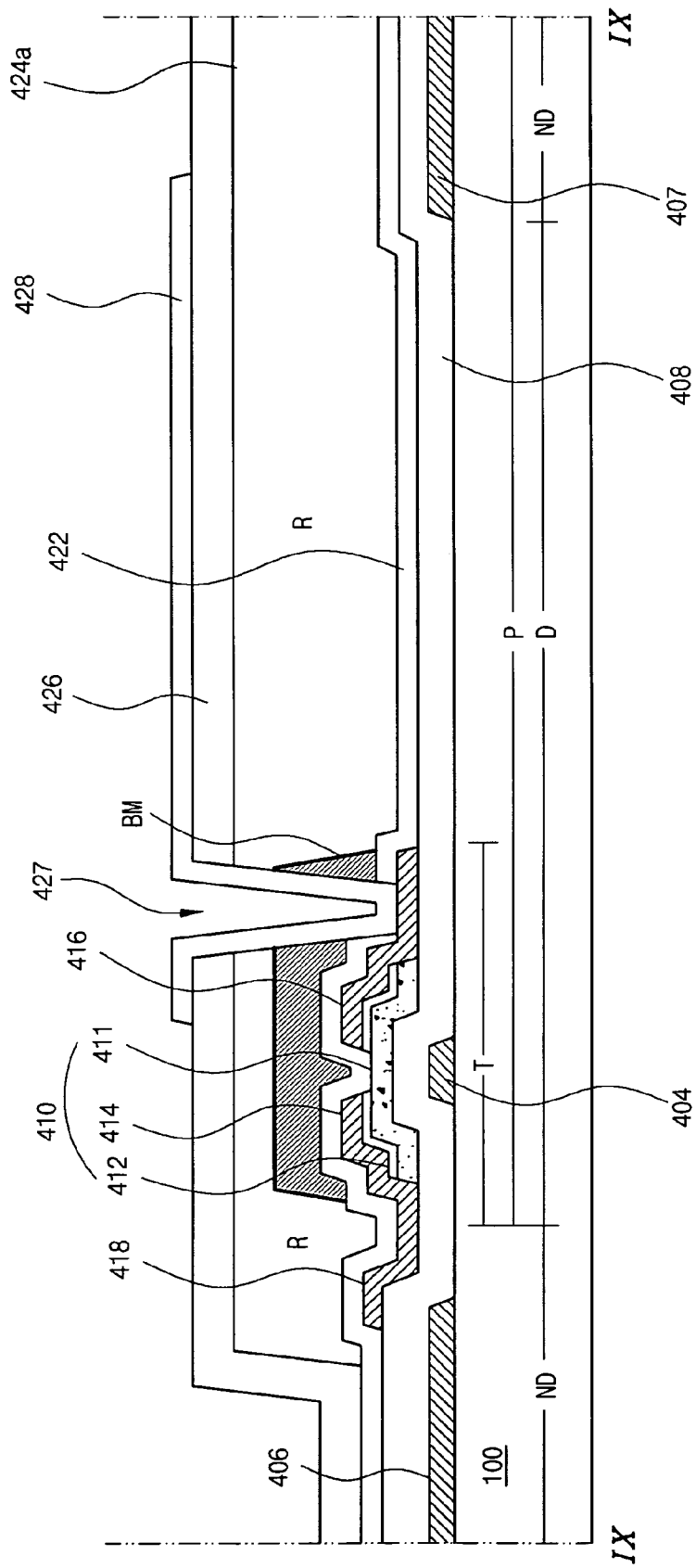
FIG. 9 is a cross-sectional view taken along cross-sectional line IX-IX of FIG. 8 where a non-display region ND is the fourth non-display region in FIG. 8.

FIG. 9 is a cross-sectional view taken along cross-sectional line IX-IX of FIG. 8. In FIG. 9, a non-display region ND is the first and fourth non-display regions in FIG. 8. The fabricating method of a substrate for a COT LCD device of the fourth embodiment is similar to that of the first to third embodiments, except for a light-shielding portion in a non-display region. Accordingly, in the fourth embodiment, explanations of parts similar to parts in the first to third embodiments will be omitted.

As shown in FIG. 9, on a substrate 100 having a display region D and a non-display region ND, a first metal is deposited, and patterned to form a gate line 402, a gate electrode 404, a first light-shielding pattern 406 and a third light-shielding pattern 407. A gate insulating layer 408 is formed entirely on the substrate 100 having the gate line 402. A semiconductor pattern 410 including an active layer 411 and an ohmic contact layer 412 is formed on the gate insulating layer 408 corresponding to the gate electrode 404.

A second metal is deposited on the substrate 100 having the semiconductor pattern 410, and patterned to form a data line 418, source and drain electrodes 414 and 416, and a second light-shielding pattern (420 in FIG. 8). Through the above processes, a thin film transistor T including the gate electrode 404, the semiconductor pattern 410, and the source and drain electrodes 414 and 416 is formed. A passivation layer 422 is formed entirely on the substrate 100 having the data line 418.

A black resin is deposited on the passivation layer 422 and patterned to form a black matrix BM corresponding to the thin film transistor T. The black matrix BM may correspond to the gate and data lines 402 and 418. A red color filter pattern (R) 424a, a green color filter pattern (424b in FIG. 8) and a blue color filter pattern (not shown) are formed in respective pixel regions P.

A planarization layer 426 is formed entirely on the substrate 100 having the color filter pattern 424a. The planarization layer 426, the color filter pattern 424a, the black matrix BM, and the passivation layer 422 are patterned to form a contact hole 427 exposing the drain electrode 416. A pixel electrode 428 is formed on the planarization layer 426 contacting the drain electrode 416 through the contact hole 427.

Figure 10:
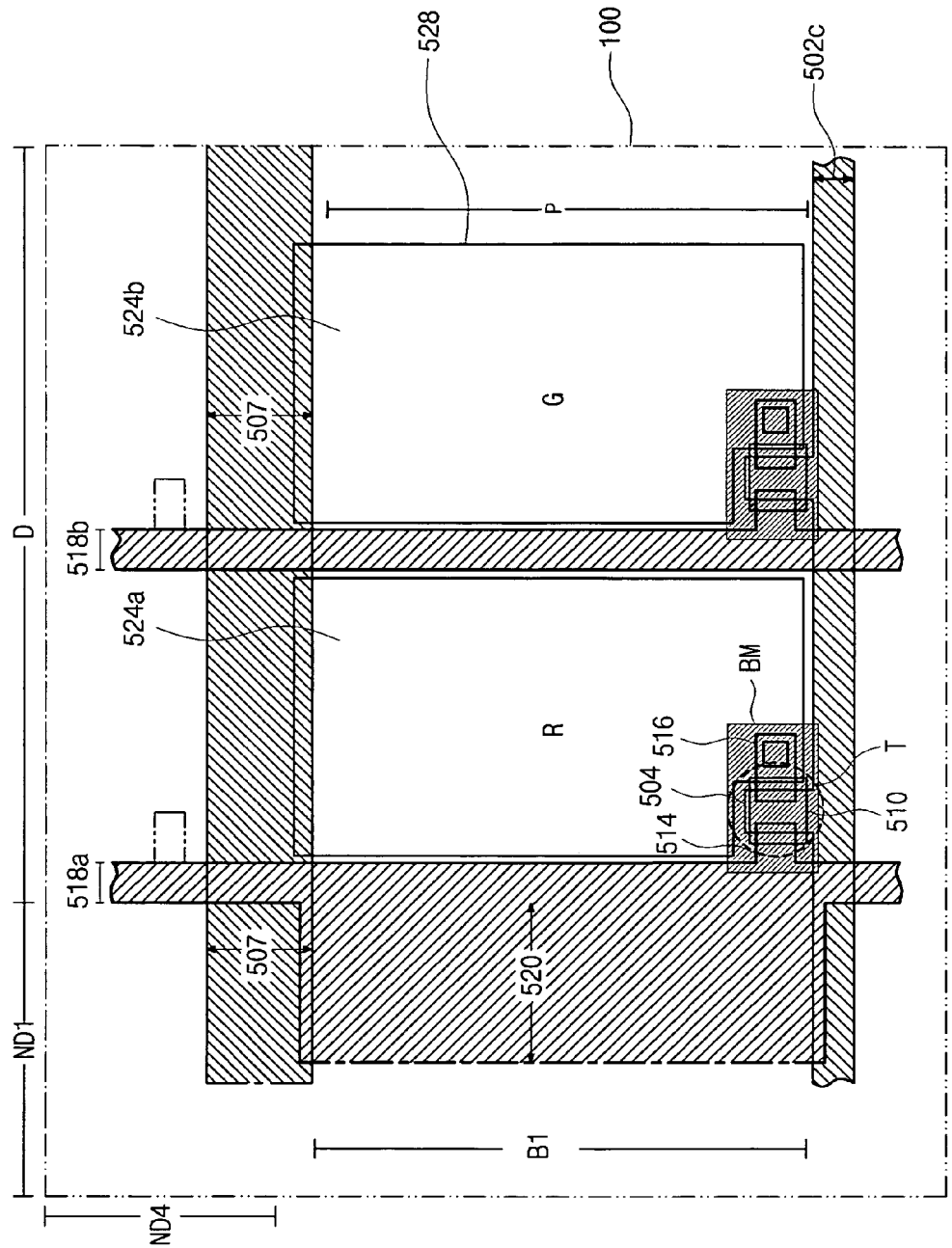
FIG. 10 is a plan view showing an enlargement of a region "A2" in FIG. 3 of a first substrate for a COT LCD according to a fifth exemplary embodiment of the present invention.

FIG. 10 is a plan view showing an enlargement of region "A2" in FIG. 3 of a first substrate for a COT LCD according to a fifth exemplary embodiment of the present invention. The fifth embodiment relates to first and fourth non-display regions. A substrate for a COT LCD device of the fifth embodiment is similar to that of the first to fourth embodiments, except for a light-shielding portion in a non-display region. In the fifth embodiment, explanations of parts similar to parts in the first to fourth embodiments will be omitted.

As shown in FIG. 10, in a display region D of a first substrate 100, a third gate line 502c, data lines 518 including first and second data lines 518a and 518b, a thin film transistor T in each pixel region P, a black matrix BM corresponding to the thin film transistor T, color filter patterns (R and G) 524a and 524b, and a pixel electrode 528 in each pixel region P are disposed. In a first non-display region ND1 parallel to the data line 518, a first light-shielding portion covers a space between adjacent gate lines 502. In a fourth non-display region ND4, a fourth light-shielding portion is disposed parallel to the third gate line 502c.

The first light-shielding portion of the fifth embodiment corresponds to that of the second and third embodiments. The first light-shielding portion includes a first light-shielding pattern 520 extended from the first data line 518a. The fourth light-shielding portion of the fifth embodiment corresponds to that of the fourth embodiment. The fourth light-shielding portion includes a second light-shielding pattern 507 parallel to and apart from the third gate line 502c. The second light-shielding pattern 507 is extended along an extension direction of the third gate line 502c. The first light-shielding pattern 520 closest to the fourth light-shielding portion is extended from the first data line 518a and covers a space B1 between the third gate line 502c and the second light-shielding pattern 507. The first light-shielding pattern 520 may overlap the third gate line 502c and the second light-shielding pattern 507, and an overlap width between the two may be equal to or less than 3 μm (micrometers) to prevent parasitic capacitance.

In accordance with the fifth embodiment of the present invention, the first light-shielding portion covers a space between adjacent gate lines and between the gate line closest to the fourth light-shielding portion and the fourth light-shielding portion in the first non-display region, and the fourth light-shielding portion is disposed in the fourth non-display region. The first light-shielding portion includes the first light-shielding pattern extended from the data line and covering a space between the gate line closest to the fourth light-shielding portion and the fourth light-shielding portion. The fourth light-shielding portion includes the second light-shielding pattern parallel to and apart from the gate line closest to the fourth light-shielding portion and extended along an extension direction of the gate line. Although not explained in the above fifth embodiment of present invention, a third light-shielding portion of a third non-display region may have the same structure as the first light-shielding portion of the first non-display region.

Figure 11:
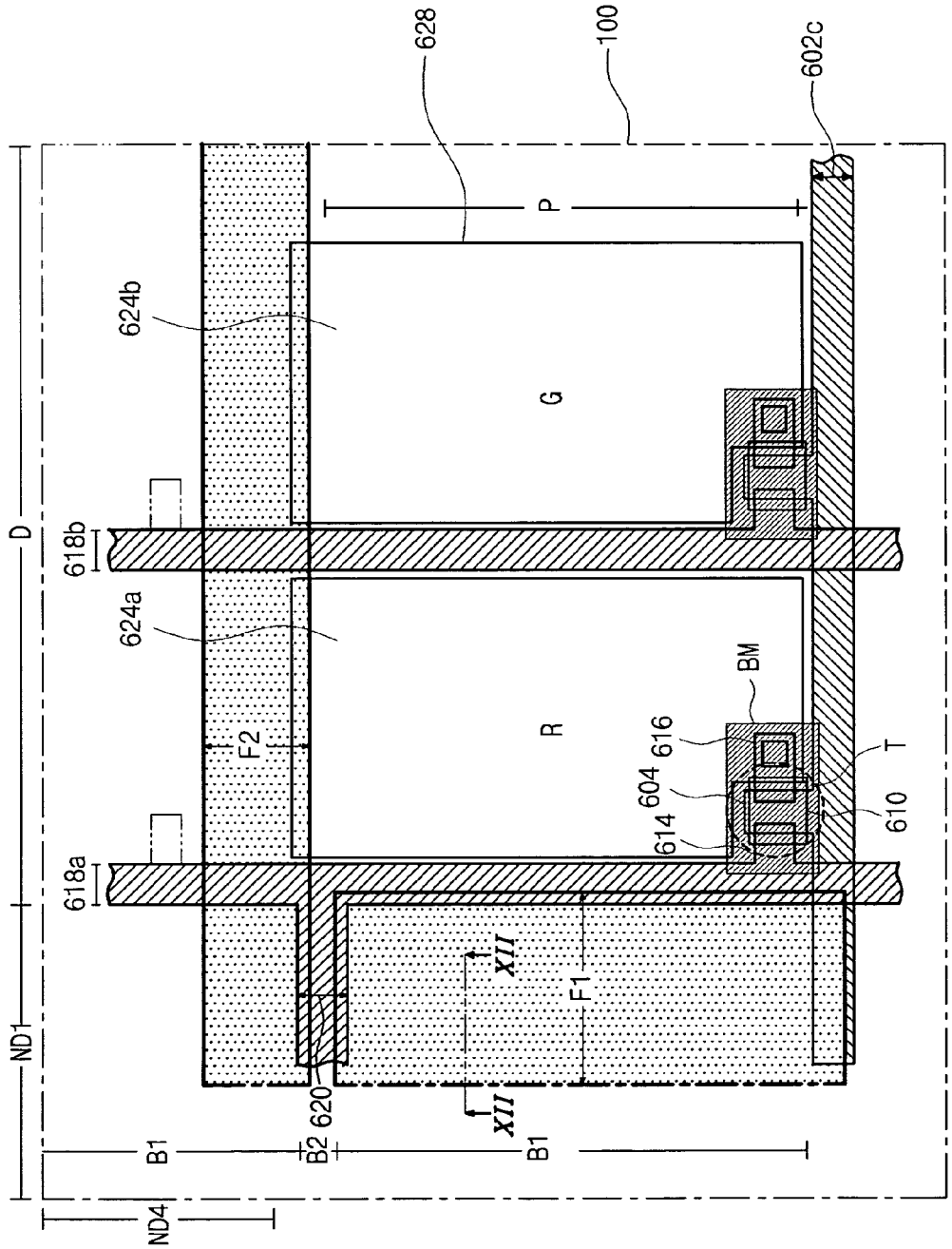
FIG. 11 is a plan view showing an enlargement of a region "A2" in FIG. 3 of a first substrate for a COT LCD according to a sixth embodiment of the present invention.

FIG. 11 is a plan view showing an enlargement of region "A2" in FIG. 3 of a first substrate for a COT LCD according to a sixth exemplary embodiment of the present invention. The sixth embodiment relates to first and fourth non-display regions. A substrate for a COT LCD device of the sixth embodiment is similar to that of the first to fifth embodiments, except for a light-shielding portion in a non-display region. In the sixth embodiment, explanations of parts similar to parts in the first to fifth embodiments will be omitted.

As shown in FIG. 11, in a display region D of a first substrate 100, a third gate line 602c, data lines 618 including first and second data lines 618a and 618b, a thin film transistor T in each pixel region P, a black matrix BM corresponding to the thin film transistor T, color filter patterns (R and G) 624a and 624b, and a pixel electrode 628 in each pixel region P are disposed. In a first non-display region ND1 parallel to the data line 618, a first light-shielding portion covers a space between adjacent gate lines 602. In the fourth non-display region ND4, a fourth light-shielding portion is disposed parallel to the third gate line 602c.

The first light-shielding portion includes a first light-shielding pattern F1 and a second light-shielding pattern 620 extended from the first data line 618a, and the fourth light-shielding portion includes a third light-shielding pattern F2 parallel to and apart from the third gate line 602c. The third light-shielding pattern F2 is extended along an extension direction of the third gate line 402c. The first light-shielding pattern F1 closest to the fourth non-display region ND4 is disposed in a space B1 between the third gate line 602c and the third light-shielding pattern F2, may overlap the third gate line 602c, and is apart from the third light-shielding pattern F2. The second light-shielding pattern 620 is extended from the first data line 618a to cover a space B2 between the first light-shielding pattern F1 and the third light-shielding pattern F2. The second light-shielding pattern 620 may overlap the first and third light-shielding patterns F1 and F2. The first and third light-shielding patterns F1 and F2 may include a dummy semiconductor pattern and a subsequently deposited dummy color filter pattern.

In accordance with the sixth embodiment of the present invention, the first light-shielding portion covers a space between adjacent gate lines and between the gate line closest to the fourth light-shielding portion and the fourth light-shielding portion in the first non-display region, and the fourth light-shielding portion is disposed in the fourth non-display region. The first light-shielding portion includes the first light-shielding pattern disposed between the gate line closest to the fourth light-shielding portion and the fourth light-shielding portion, and the second light-shielding pattern extended from the data line and covering a space between the first light-shielding pattern and the fourth light-shielding portion. The fourth light-shielding portion includes the third light-shielding pattern parallel to and apart from the gate line closest to the fourth light-shielding portion and extended along an extension direction of the gate line. The first and third light-shielding patterns may include a dummy semiconductor pattern and a dummy color filter pattern. Although not explained in the above first embodiment of present invention, a third light-shielding portion of a third non-display region may have the same structure as the first light-shielding portion of the first non-display region.

Figure 12:
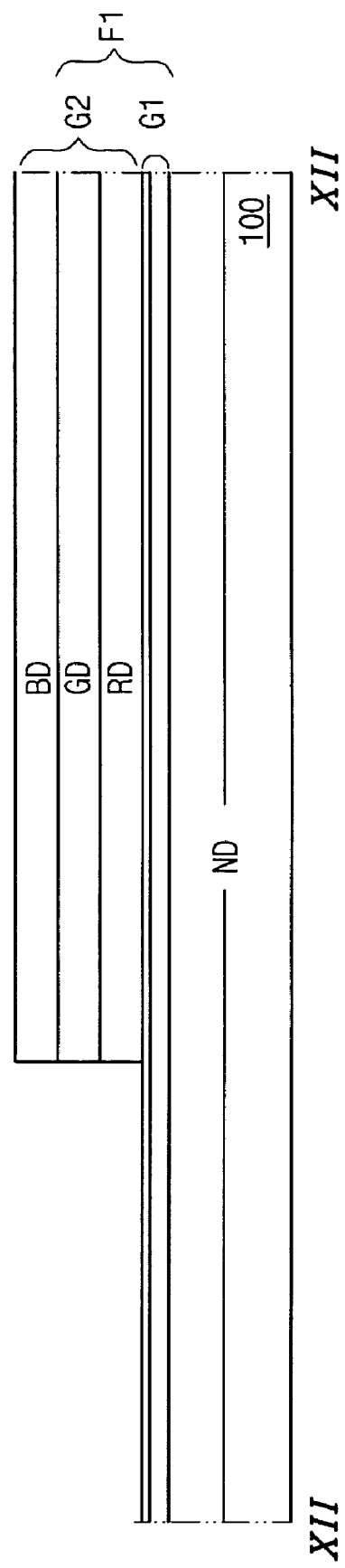
FIG. 12 is a cross-sectional view, which is taken along cross-sectional line XII-XII in FIG. 11 showing a first light-shielding pattern according to the sixth embodiment.

FIG. 12 is a cross-sectional view along cross-sectional line XII-XII in FIG. 11 of a first light-shielding pattern according to the sixth embodiment. In FIG. 12, a non-display region ND is the first non-display region in FIG. 11.

As shown in FIG. 12, in a non-display region ND of the substrate 100, a dummy semiconductor pattern G1 is formed in the same process of forming the semiconductor pattern (610 in FIG. 11). The dummy semiconductor pattern G1 may include a first layer of intrinsic amorphous silicon and a second layer of doped amorphous silicon like the semiconductor pattern (610 in FIG. 11). A dummy color filter pattern G2 is formed on the dummy semiconductor pattern G1. The dummy color filter pattern G2 may include dummy red, dummy green and dummy blue color filter patterns RD, GD and BD. The dummy color filter pattern G2 is formed in the same process of forming the color filter pattern (624 in FIG. 11).

Figure 13:
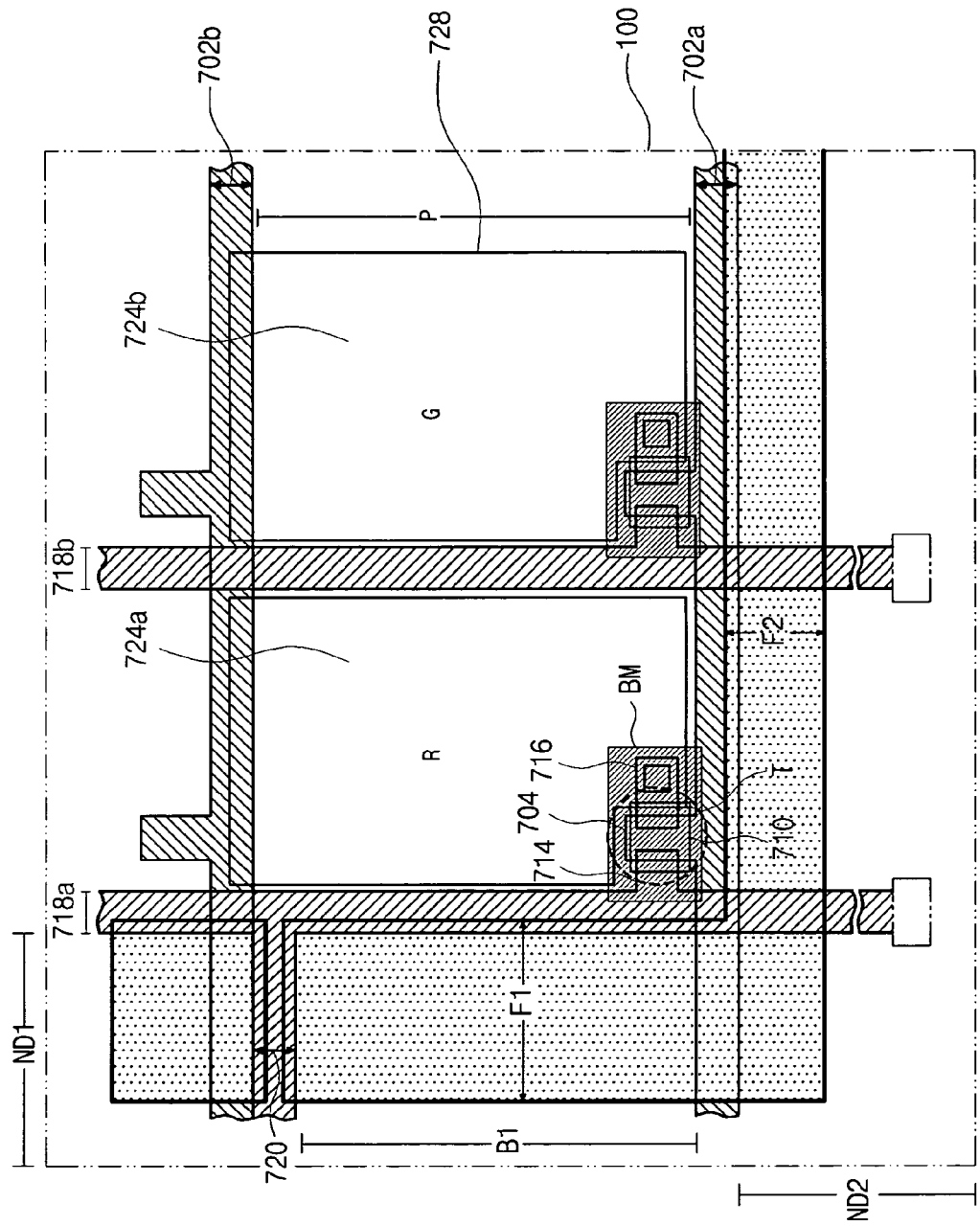
FIG. 13 is a plan view showing an enlargement of a region "A1" in FIG. 3 of a first substrate for a COT LCD according to a seventh exemplary of the present invention.

FIG. 13 is a plan view showing an enlargement of region "A1" in FIG. 3 of a first substrate for a COT LCD according to a seventh exemplary embodiment of the present invention. The seventh embodiment relates to first and second non-display regions. A substrate for a COT LCD device of the seventh embodiment is similar to that of the first to sixth embodiments, except for a light-shielding portion in a non-display region. In the seventh embodiment, explanations of parts similar to parts in the first to sixth embodiments will be omitted.

As shown in FIG. 13, in a display region D of a first substrate 100, gate lines 702 including first and second gate lines 702a and 702b, data lines 718 including first and second data lines 718a and 718b, a thin film transistor T in each pixel region P, a black matrix BM corresponding to the thin film transistor T, color filter patterns (R and G) 724a and 724b, and a pixel electrode 728 in each pixel region P are disposed. In a first non-display region ND1 parallel to the data line 718, a first light-shielding portion covers a space between adjacent gate lines 702. In the second non-display region ND2, a second light-shielding portion is disposed parallel to the gate line 702.

The first light-shielding portion includes a first light-shielding pattern F1 and a second light-shielding pattern 720 extended from the first data line 718a, and the second light-shielding portion includes a third light-shielding pattern F2 parallel to the first gate line 702a. The third light-shielding pattern F2 is extended along an extension direction of the first gate line 702a. The first light-shielding pattern F1 is disposed in a space B1 between the first and second gate lines 702a and 702b, and is apart from the second gate line 702b. The second light-shielding pattern 720 is extended from the first data line 718a to cover a space between adjacent first light-shielding patterns F1. The first and second light-shielding patterns F1 and 720 may overlap each other. The third light-shielding pattern F2 may overlap the first gate line 702a. The first and third light-shielding patterns F1 and F2 may include a dummy semiconductor pattern and a dummy color filter pattern subsequently deposited.

In accordance with the seventh embodiment of the present invention, the first light-shielding portion covers a space between adjacent gate lines in the first non-display region, and the second light-shielding portion is disposed in the second non-display region. The first light-shielding portion includes the first light-shielding pattern disposed between adjacent gate lines, and the second light-shielding pattern extended from the data line and covering a space between adjacent first light-shielding patterns. The second light-shielding portion includes the third light-shielding pattern parallel to the gate line and extended along an extension direction of the gate line. The first and third light-shielding pattern may include a dummy semiconductor pattern and a dummy color filter pattern. Although not explained in the above seventh embodiment of present invention, a third light-shielding portion of a third non-display region may have the same structure as the first light-shielding portion of the first non-display region.

The fabricating method of the substrate for the COT LCD device according to the seventh embodiment is similar to that according to the first to sixth embodiments, except for the light-shielding portion in the non-display region. Therefore, in the seventh embodiment, the fabricating method of the substrate for the COT LCD device according to the first to sixth embodiments is applied similar to that of the first to sixth embodiments.

It will be apparent to those skilled in the art that various modifications and variations can be made in the array substrate for a liquid crystal display device and the fabricating method thereof of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display (LCD) device, comprising:
    a substrate having a display region and a non-display region at periphery portions of the display region, the non-display region including first, second, third and fourth regions;
    a plurality of gate lines parallel to the second and fourth regions, the plurality of gate lines including a first gate line closest to the second region and a second gate line closest to the fourth region;
    a plurality of data lines parallel to the first and third regions and crossing the plurality of gate lines to define a plurality of pixel regions in the display region, the plurality of data lines including a first data line closest to the first region; and
    a light-shielding portion corresponding to the non-display region and disposed at the same layer as at least one of the gate line and the data line, the light-shielding portion including first, second, third and fourth portions corresponding to the first, second, third and fourth regions, respectively,
    wherein the first portion includes a first pattern extended from each gate line to adjacent gate line and formed of the same material as the plurality of gate lines, and the first pattern is spaced apart from the adjacent gate line by a predetermined space, and wherein a second pattern is extended from the first data line and covering the predetermined space between the first pattern and the adjacent gate line,
    wherein the first pattern is disposed at the same layer as the plurality of gate lines, and the second pattern is disposed at the same layer as the first data line.

2. The array substrate according to claim 1, wherein the second portion includes a third pattern extended from each data line to the adjacent data line, and a fourth pattern extended from the first gate line and covering a space between the third pattern and the adjacent data line.

3. The array substrate according to claim 1, wherein the second portion includes a first pattern extended from each data line to the adjacent data line, and a second pattern extended from the first gate line and covering a space between the first pattern of the second portion and the adjacent data line.

4. The array substrate according to claim 3, wherein the second pattern of the second portion overlaps the first pattern of the second portion and the adjacent data line with an overlap width of equal to or less than 3 μm (micrometers).

5. The array substrate according to claim 1, wherein the third portion corresponds in structure to the first portion.

6. The array substrate according to claim 1, wherein the second portion includes a first pattern extended from the first gate line and covering a space between each data line and adjacent data line.

7. The array substrate according to claim 6, wherein the first pattern of the second portion overlaps the data line with an overlap width of equal to or less than 3 µm (micrometers).

8. The array substrate according to claim 1, wherein the fourth portion is extended along an extension direction of the gate lines.

9. The array substrate according to claim 8, wherein the first portion further includes a third pattern extended from the second gate line to the fourth portion, and a fourth pattern extended from the first data line and covering a space between the third pattern and the fourth portion.

10. The array substrate according to claim 9, wherein the fourth pattern overlaps the third pattern and the fourth portion with an overlap width of equal to or less than 3 µm (micrometers).

11. The array substrate according to claim 8, wherein the first portion further includes a third pattern extended from the first data line and covering a space between the second gate line to the fourth portion.

12. The array substrate according to claim 11, wherein the third pattern overlaps the second gate line and the fourth portion with an overlap width of equal to or less than 3 µm (micrometers).

13. The array substrate according to claim 1, wherein the second pattern overlaps the first pattern and the adjacent gate line with an overlap width of equal to or less than 3 µm (micrometers).

14. The array substrate according to claim 1, further comprising a thin film transistor, a color filter pattern and a pixel electrode in each pixel region, the color filter pattern being disposed on the thin film transistor.

15. The array substrate according to claim 1, further comprising a thin film transistor, a color filter pattern and a pixel electrode in each pixel region, and a black matrix at a location corresponding to the thin film transistor, wherein the color filter pattern and the black matrix include a contact hole exposing the thin film transistor.

16. An array substrate for a liquid crystal display (LCD) device, comprising:
a substrate having a display region and a non-display region at periphery portions of the display region, the non-display region including first, second, third and fourth regions;
a plurality of gate lines parallel to the second and fourth regions, the plurality of gate lines including a first gate line closest to the second region and a second gate line closest to the fourth region;
a plurality of data lines parallel to the first and third regions and crossing the plurality of gate lines to define a plurality of pixel regions in the display region, the plurality of data lines including a first data line closest to the first region; and
a light-shielding portion corresponding to the non-display region and disposed at the same layer as at least one of the gate line and the data line, the light-shielding portion including first, second, third and fourth portions corresponding to the first, second, third and fourth regions, respectively,
wherein the first portion includes a first pattern extended from the first data line and covering a space between each gate line and adjacent gate line, and wherein the first pattern has a width along the first data line being substantially equal to a width of the space along the first data line,
and wherein the second portion includes a second pattern extended from each data line to adjacent data line, and the second pattern is spaced apart from the adjacent data line by a predetermined space, and wherein a third pattern is extended from the first gate line and covering the predetermined space between the second pattern and the adjacent data line, wherein the second pattern is disposed at the same layer as the plurality of data lines.

17. The array substrate according to claim 16, wherein the second portion includes a second pattern extended from the first gate line and covering a space between each data line and adjacent data line.

18. The array substrate according to claim 16, wherein the first pattern overlaps the gate line with an overlap width of equal to or less than 3 µm (micrometers).

19. An array substrate for a liquid crystal display (LCD) device, comprising:
a substrate having a display region and a non-display region at periphery portions of the display region, the non-display region including first, second, third and fourth regions;
a plurality of gate lines parallel to the second and fourth regions, the plurality of gate lines including a first gate line closest to the second region and a second gate line closest to the fourth region;
a plurality of data lines parallel to the first and third regions and crossing the plurality of gate lines to define a plurality of pixel regions in the display region, the plurality of data lines including a first data line closest to the first region and a second data line closest to the third region;
a thin film transistor including a semiconductor pattern in each pixel region;
a color filter pattern in each pixel region; and
a light-shielding portion corresponding to the non-display region and including a first light-shielding pattern at the same layer and of the same material as the semiconductor pattern and a second light-shielding pattern at the same layer and of the same material as the color filter pattern, wherein the light-shielding portion includes first, second, third and fourth portions corresponding to the first, second, third and fourth regions, respectively,
wherein the display region is surrounded by the first and second gate lines and the first and second data lines,
wherein the first portion includes a first pattern and a second pattern, and the first pattern is disposed between one gate line and another one gate line, which is adjacent to the one gate line,
wherein one end of the first pattern is spaced apart from the one gate line, and the other end of the first pattern overlaps the another one gate line,
wherein the second pattern extends from the first data line and covers a space between the one gate line and the one end of the first pattern.

20. The array substrate according to claim 19, wherein the second portion is extended along an extension direction of the gate line, and wherein the second portion includes a second dummy semiconductor pattern and a second dummy color filter pattern.

21. The array substrate according to claim 20, wherein the second portion overlaps the first gate line.

22. The array substrate according to claim 20, wherein the second dummy color filter pattern includes red, green and blue dummy color filter patterns.

23. The array substrate according to claim 19, wherein the third portion corresponds in structure to the first portion.

24. The array substrate according to claim 19, wherein the second portion is extended along an extension direction of the gate line, wherein the second portion includes a dummy semiconductor pattern and a dummy color filter pattern.

25. The array substrate according to claim 24, wherein the second portion overlaps the first gate line.

26. The array substrate according to claim 24, wherein the dummy color filter pattern includes red, green and blue dummy color filter patterns.

27. The array substrate according to claim 19, wherein the fourth portion is extended along an extension direction of the gate line, wherein the fourth portion includes a first dummy semiconductor pattern and a first dummy color filter pattern.

28. The array substrate according to claim 27, wherein the first portion covers a space between the second gate line and the fourth portion, and includes a first pattern disposed between the second gate line and the fourth portion and a second pattern covering a space between the first pattern and the fourth portion, and wherein the first pattern includes a second dummy semiconductor pattern and a second dummy color filter pattern.

29. The array substrate according to claim 28, wherein the second dummy color filter pattern includes red, green and blue dummy color filter patterns.

30. The array substrate according to claim 27, wherein the first dummy color filter pattern includes red, green and blue dummy color filter patterns.

31. The array substrate according to claim 19, wherein the color filter pattern includes red, green and blue color filter patterns in respective pixel regions.

32. The array substrate according to claim 19, wherein the first dummy color filter pattern includes red, green and blue dummy color filter patterns.

33. The array substrate according to claim 19, wherein the second portion is extended along an extension direction of the gate line.

* * * * *